May 14, 1946.  A. H. KELDERHOUSE  2,400,202
FEED MIXER
Filed May 15, 1942

A. H. KELDERHOUSE
INVENTOR.

BY Dick and Bailey

Patented May 14, 1946

2,400,202

UNITED STATES PATENT OFFICE 2,400,202

FEED MIXER

Austin Henry Kelderhouse, Collins, Iowa

Application May 15, 1942, Serial No. 443,145

3 Claims. (Cl. 259—9)

This invention relates to mixers and is specifically concerned with devices intended primarily for the mixing of feeds.

Research and experience have shown that cattle and other livestock being fed for final marketing gain weight more than proportionately rapidly and acquire a smoother and higher grade appearance as well as provide a finer quality meat if they are fed materials in addition to the grains and forage commonly raised by the farmers in the localities where feeding is done on an extensive scale. Due to its effects, one of the most accepted and highly desirable supplements is molasses. However, it is almost impossible to feed the molasses to livestock in its pure and unmixed form, so that the expedient has been adopted of mixing it with some other food, normally something in the nature of roughage which may very well, and often does, consist of material which is actually available, almost as waste, on the precise farm where the molasses mixture is being fed. The present practice is for the molasses to be mixed with the base material at feed mills or processing plants frequently located many hundreds of miles from the feeding lots and in vicinities where roughage is either at a premium, is not available in the most desirable form, or is required that it be imported. The farmer-feeder then buys his molasses at retail, paying for a high percentage of material of which he has an abundance going to waste on his own farm, the price being augmented by substantial handling and transportation charges as well as by several profits.

It is an object of this invention to provide a device adapted to be employed by feeders on their own farms to mix available roughage with pure or unmixed molasses.

Another object of this invention is to provide a novel mixer construction.

Another object of this invention is to provide a mixer adapted to adequately mix roughage with other materials including some having at least a degree of fluidity.

A further object is to furnish a mixer capable of providing a high quality food.

Another object of my invention is to disclose a mixer adapted to cause semi-liquid material to impregnate porous material with which it is being mixed.

Yet another object is to make available a mixer which is adapted to simultaneously move material in opposite directions.

A further object is to provide a mixer adapted to operate continuously being capable of delivering mixed material while yet continuing to mix other material.

Basically and in general my novel mixer comprises a truncated conical or truncated pyramidical shaped housing having adjacent its restricted end a discharge port. Within this housing is contained mixing means and conveying means preferably associated together into the same general assembly, said conveying means being adapted to transport the thoroughly mixed material to the discharge port in the housing. The material intake port is most appropriately located near the larger end of the housing. Thus it will be seen that the material being mixed is gradually compressed as the mixing operation proceeds or rather it should perhaps be said that the material being mixed is gradually increasingly confined for there may be no substantial compression of the individual pieces and/or particles of the materials being mixed but these pieces and/or particles are being brought into increasingly more intimate contact and engagement with one another. When molasses is being mixed with chopped corn fodder, for example, the molasses is forced into the numerous pores and interstices in the chips of the fodder.

In order that a clear and concise understanding of my invention may be had reference should be made to the accompanying drawing forming a part of this specification in which Fig. 1 is a perspective view of one embodiment of my invention.

Figure 1:
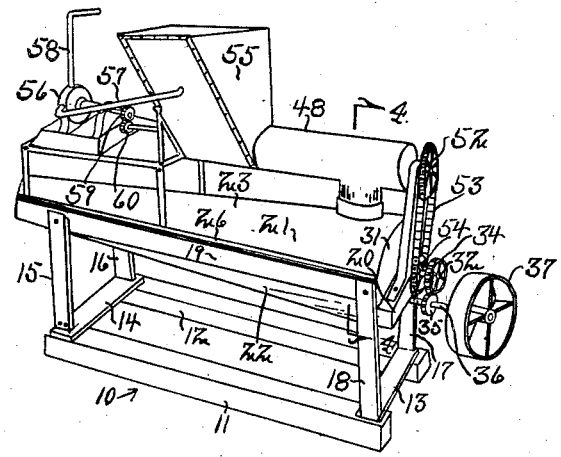
Figure 4:
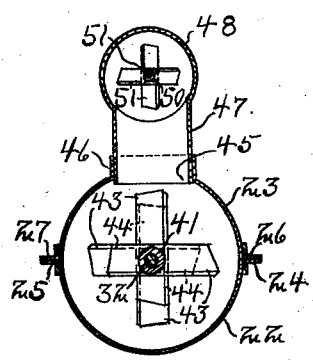
Figure 4 is a slightly enlarged vertical cross sectional view of Fig. 1 taken on line 4—4 thereof.
Figure 2:
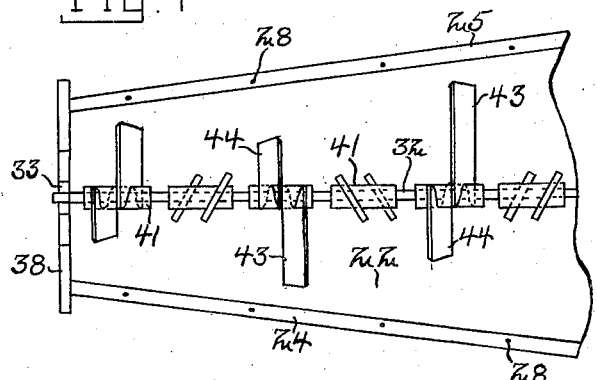
Fig. 2 is an enlarged fragmentary top plan view of the main mixing chamber of the device shown in Fig. 1, the top or cover section of the housing being removed to clearly reveal the construction.
Figure 5:
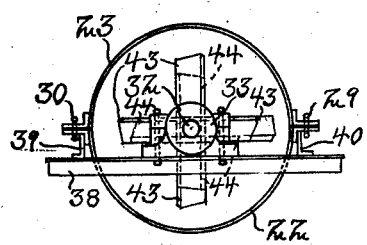
Fig. 5 is an enlarged fragmentary end elevation of the device illustrated in Fig. 1 showing the discharge port and adjacent parts.
Figure 3:
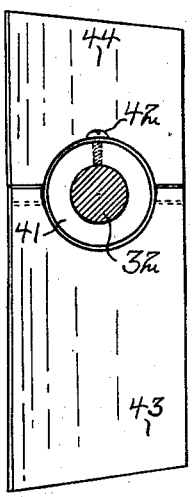
Fig. 3 is an enlarged face elevation of a mixing element of the type which I prefer, shown in place on the drive shaft.
Figure 6:
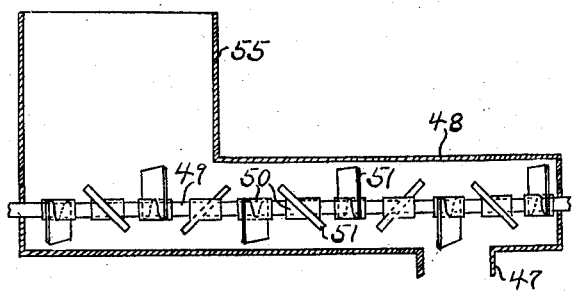
Fig. 6 is an enlarged longitudinal sectional view of the auxiliary mixing chamber and feed hopper.

Referring more specifically to the drawing I have employed the numeral 10 to designate generally the standard or support structure upon which I mount my mixer. The nature of the support for my mixer may of course be widely varied; it may, for example, consist of a hanger rather than a standard. As a matter of fact, the mixer may even be disposed directly on the general supporting surface, such for example, as the floor of a building. The support 10, as I have shown it in the drawing includes runners 11 and 12, cross braces 13 and 14, generally upwardly extending members 15, 16, 17, and 18, beam 19, connecting members 15 and 18, a corresponding beam (not shown) connecting members 16 and 17, and a cross-beam 20. The generally upwardly extending members 15 and 16 are each inwardly inclined so that their tops are more adjacent one another than are their bases. The reason for this arrangement is to conform the shape of the space between the beam 19 and the corresponding beam connecting members 16 and 17, to the longitudinal cross section of the main housing 21 of my device which is supported by said beam 19 and its correspondent. The housing 21 as I have illustrated it in the drawing has the shape of a truncated cone with its restricted or smaller end adjacent the support members 15 and 16 and its larger end adjacent the support members 17 and 18. The said housing 21 includes a lower section 22 and an upper section 23 adapted to be fitted together in adjacent opposed relationship. As appears clearly in Figs. 2, 4, and 5, the lower section 22 is provided along each of its longitudinal edges with angle irons 24 and 25, and the section 23 is provided with angle irons 26 and 27 along its longitudinal edges. The angle irons 24 and 25 are provided along their lengths with spaced apart orifices 28 and similar orifices are provided in angle irons 26 and 27 adapted to register with the orifices in the angle irons 24 and 25, said orifices being adapted to receive the shanks of bolts 29 and 30 or other fastening means whereby said angle iron 26 is secured to angle iron 24 and angle iron 27 is attached to iron 25 thus securely uniting section 23 of the housing 21 with section 22 thereof. In the present embodiment, the horizontally disposed flanges of the angle irons 24 and 25 rest, respectively, upon the beam 19 and its correspondent whereby support of the housing 21 on structure 10 is effected. The large end of the housing 21 is provided with a closure 31 while its reduced end is open as appears clearly in Fig. 5. Extending longitudinally within the housing 21 is the shaft 32 rotatably mounted adjacent the reduced end of said housing in the bearing 33, and having its opposite end portion extending through the closure 31 and rotatably mounted upon bearing structure (not shown) supported optionally, upon the cross beam 20. Upon the portion of said shaft 32 which extends outwardly from the closure 31 a driven gear 34 is provided adapted to engage a driving gear 35 locked to the jack shaft 36 which also carries the pulley 37 designed to cooperate with a power belt whereby the jack shaft, the gear train and the shaft 32 may be rotated. If desired, the pulley 37 may directly engage the shaft 32 or other means for rotating said shaft may be provided. As the particular construction being disclosed is illustrated in Fig. 5 the bearing 33 is supported by a cross angle iron 38 which in turn may, if desired, be dependingly mounted upon the angle irons 24 and 25, preferably at least primarily forward of the ends thereof by and suitable means such as the hangers 39 and 40. The bearing 33 may of course be of any suitable nature and the same is true concerning its mount. Upon the shaft 32, within the housing 31, I have shown a plurality of sleeves 41 adapted to be slid along said shaft for the purpose of being positioned, after which they may be securely fastened in place by any suitable means, such for example, as the set screw 42 (Fig. 3). Upon each of said sleeves 41 I have mounted a long fin or paddle 43 and a relatively shorter fin or paddle 44. As will be apparent from viewing Fig. 2, the paddles 43 and 44 are shorter adjacent the reduced end of the housing 21 than they are in less restricted portions of the housing chamber. The change in length of the paddles preferably directly corresponds to the taper of the housing 21 from end to end thereof. Attention is directed to the fact that the large and small paddles on each sleeve extend outwardly therefrom in generally opposite directions. While such a construction is by no means essential; it is very acceptable. As is also apparent from Fig. 2, the paddles do not set transversely of the sleeves 41 but rather are mounted diagonally thereon whereby when the shaft 32 together with the sleeves 41 and the paddles 43 and 44 are rotated by the pulley 37 the action of said paddles 43 and 44 is similar to that of fan blades; in other words, the paddles 43 and 44 tend to move materials with which they come into contact along the interior of the housing 21. The construction is preferably such that the shorter blades 44 tend to move the contents of the housing 21 toward the closed large end thereof while the longer paddles 43 tend to move said contents toward the open restricted end of the said housing. With such an arrangement, obviously the action of the longer blades is more potent than that of the shorter blades so that the material within the housing is ultimately driven to the discharge port. However, during its progression along said housing, portions within the reach of the short paddles 44 are moved in the opposite direction whereby an exceedingly desirable stirring or mixing effect is procured in addition to the swirling and mixing effect inherently produced by the rotation of the inclined blades. It will be noted that I have shown every fourth pair of paddles disposed in a generally similar direction and that each pair varies in position from that of the pair on each side by approximately a ninety degree arc, the relationship being progressive about the shaft. Such arrangements are, of course, optional. In certain instances it is desirable although by no means necessary that a longitudinal edge of each of the blades be sharpened to at least a limited extent. Either the edge may be beveled or the entire blade may be a triangular shape in transverse cross section.

About the intake port 45 of the housing 21, I have provided a collar 46 cooperating with the conduit 47 which communicates with the interior of the secondary housing 48. Any suitable communication system between the two housings, may be employed, Within the said secondary housing 48 a rotatable shaft 49 is provided having sleeves 50 carrying paddles 51, received thereon. The paddles 51 may be mounted directly on the shaft 49 or other appropriate mixing and/or propelling means may be substituted for the shaft and paddles; however, in the construction shown each sleeve 50 carries one paddle 51 mounted thereon in such a manner that it tends to flow material toward the point at which the conduit 47 communicates with the housing 48. I have indicated a sprocket wheel 52 mounted upon an extension of the shaft 49 engaging the drive chain 53 for rotating said shaft 49. The chain 53 is driven by a sprocket wheel 54 mounted upon the extended end of the paddle shaft 32. Obviously, the sprocket wheel 54 may be mounted upon the jack shaft 36, if desired, or other means for propelling the shaft 49 may replace the structure shown. Also in communication with the housing 48 is the hopper 55 into which the pump 56 is adapted to introduce flowable material through the conduit 57. The intake pipe 58 of the pump 56 may be in communication with a molasses barrel or other suitable supply source. In the particular embodiment shown, the drive shaft of said pump 56 is provided with a gear 59 which engages a gear 60 locked to an extension of the shaft 49.

In operating the device illustrated to provide high molasses content feed, roughage, preferably in small pieces such, for example as chopped corn fodder, may be introduced into the top of the hopper 55 simultaneously with the introduction of molasses into said hopper by means of the pump 56. The paddles 51 in the auxiliary housing 48 propel the roughage and molasses along said housing 48 toward the point at which the conduit 47 communicates with said housing 48, mixing the molasses with the fodder as it drives them. Upon reaching the conduit 47, the material being mixed travels downwardly through said conduit and through the intake port 45 into the housing 21 where it comes into contact with the paddles 43 and 44. I prefer to feed the material into the mixer at a rate such that in normal operation the large end of its housing 21 is approximately half full or a little more. As the material comes into the effective range of the paddles 43 and 44 it is vigorously mixed about.

While I do not wish to be limited by my theories, it is my opinion that among other things in at least the large section of the housing the material being mixed is thrown up and over the shaft 32 by the paddles as they rotate. Also I believe that the smaller paddles 44 tend to tear the centrally located materials loose from the general stream being advanced by the larger paddles 43. As has heretofore been stated, the material is ultimately propelled to the reduced section of the housing where it is discharged through the open end thereof. As the material travels along the length of the housing into continually more confined quarters, the bits of roughage are forced closer and closer together and into more and more intimate contact with the molasses, until by the time the discharge port has been reached no inconsiderable portion of the molasses has been actually forced into the open pores and interstices in the roughage. It will be noted that in this preferred embodiment the squeezing of the molasses into the fodder does not occur until substantial opportunity for mixing has been provided since the large section of housing 21 is normally only partially filled. In addition to providing a premixing chamber the housing 48 and associated parts serve also to at least control and limit the "blow back" which tends to be emitted through the intake port 45 due to the pressure which builds up within the housing 21.

In practicing my novel process of mixing, I move a portion of the material being mixed in one general direction and another portion thereof in a generally opposite direction, there preferably being contact between contra moving parts. Non-essentially simultaneously with the execution of at least a portion of such movements, I gradually compress said material whereby the constituents are forced into more intimate relationships with one another. Although I like to compress the material while moving parts of it in opposite direction, these steps may occur at separate times and the one which precedes the other is not absolutely material. As a matter of fact, one may be employed without the other. Other mixing and/or agitating impulsions may be applied contemporaneously with those of my novel processes, or either of them.

In order that the user of this disclosure may know some of deviations which I may make while yet providing a workable device, certain permissible variations and eliminations in the mixer as heretofore described are mentioned specifically. It is to be understood, however, that the treatment of modifications is not exhaustive. In its simplest form my device includes a chamber having a taper for at least a portion of its expanse disposed in the general direction along which material flows, and means for causing material to flow in said direction whereby it is brought into contact with said tapering service. From this, it will be seen that the auxiliary housing 48 and associated parts, may be eliminated. Also, while I consider the arrangement on the shaft 32 of paddles varying in size and so disposed that the smaller paddles tend to drive the material within the mixer in one direction and the larger paddles tend to drive said material in the opposite direction and toward the exhaust port, to be an important and meritorius construction, other means may replace it within the housing 21. The drive for the auxiliary shaft 49, if present, as well as that for the main shaft 42 may, of course, be varied. The hopper 55 need not be present, but if it is it may feed directly into the housing 21, or if the secondary housing 48, and associated parts, is being used, said hopper may communicate therewith at any appropriate juncture. Chopped roughage may be supplied to the primary chamber 21 directly from the hammer mill or other chopping device, if such procedure is deemed expedient. The pump 56 is obviously non-essential to my invention and any suitable means for supplying material to the hopper or directly into the chamber 21, may be employed. For example, if molasses is a constituent, the barrel containing the same may be supported in an elevated position so that gravity will cause its flow; if necessary, to facilitate the flow, the molasses may be heated by any suitable means such as coils containing heated water and/or antifreeze. The precise construction of the housing 21 is immaterial: clearly it is only the interior which need be tapered and this taper need not extend entirely along the length of the housing; the exhaust port may be variously located in the housing so long as it is at a juncture such that the material within the housing has passed at least a substantial portion of the tapered section thereof before being discharged. Similarly the location of the intake port may be varied and so may the means through which the housing 21 communicates with the housing 48 when the latter is being used. The housing 21 need not be capable of being separated into sections as is shown in the drawing in the portions 22 and 23. Referring to the shaft 32, the means of mounting thereof, if the same be present, is optional. The sleeves 41 may, of course, be eliminated as may also the sleeves 50 and all paddles may be mounted directly or by any other suitable means, upon their respective shafts. If employed, the sleeves supporting the paddles may be permanently or detachably secured to the shafts in any suitable manner. Again any appropriate device may replace the paddles as mixing and propelling means and the paddles or their substitutes, may be otherwise mounted on a straight shaft like 32. I have found, however, that the use of paddles is preferably over, for example, an auger, for the reason that they clean themselves to a very considerable extent. Instead of providing a substantial number of smaller paddles 44, I may use a lesser number of relatively larger paddles for imparting the opposed motion; of course, the opposed motion itself may be dispensed with. The sizes of the paddles need not vary with the taper of the housing nor is it positively essential that the paddles extend the whole length of the chamber. The disposition of the paddles on their respective sleeves may be widely varied. I have shown the housing as horizontally disposed; however, it may be otherwise positioned. As a matter of fact, frequently a vertical position is to be desired as gravity may then be used to aid in propelling the material being mixed toward the discharge port. Also the taper of the housing need not be smooth. Desirable mixing results are obtained even though the housing 21 is not tapered, but, of course, no substantial squeezing effect is provided. If the housing be not tapered, the mixing apparatus should comprise an assembly resembling my paddles 43 and 44 suitably rotatably mounted or other elongated structure having paddles distributed along its length.

In illustrating the operation of my mixer, I have employed chipped corn fodder and molasses as the materials being mixed. In preparing a stock feed it is frequently desirable to include with molasses and corn fodder, hay or other roughage, and a quantity of cotton seed meal. The device may be used in mixing various materials of both an edible and an inedible nature.

In the ensuing claims when reference is made to taper in a housing, the interior of the housing is contemplated, for the outside shape of the housing structure is not particularly essential. Conical includes pyramidical, truncated conical and truncated pyramidical.

While I have described a particular embodiment of my invention together with certain modifications thereof for illustrative purposes, it is apparent that one skilled in the art will be able to make alterations, eliminations, and modifications in the precise structures described, and this without departing from the true spirit and scope of my invention. I wish therefore to be limited herein only by the appended claims.

I claim:

1. A device of the type described comprising a housing at least a portion of which is tapered and which has a discharge port adjacent its reduced section and an intake port proximate its larger section, means within said housing for mixing material and for moving material from said intake port toward said discharge port, a second housing in communication with said intake port, a rotatable shaft within said second housing, paddle members on said rotatable shaft adapted to mix material and propel the same toward said intake port, there being paddles substantially the entire length of said second housing, a hopper in communication with a portion of said second housing remote from said intake port and a fluid conduit in communication with said hopper.

2. A device of the type described in claim 1 including an extension on one end of said shaft, a pump in communication with said fluid conduit and means for operatively connecting said pump to said shaft extension.

3. In a device of the type described an elongated primary housing having an intake port adjacent one of its ends and an exhaust port adjacent the other of its ends, an elongated secondary housing above said primary housing having an intake port adjacent one of its ends and an exhaust port adjacent the other of its ends, the said latter port being in communication with the intake port of said primary housing, a rotatable shaft within said secondary housing and extending therebeyond adjacent the intake port end thereof, a pump disposed above said primary housing and means for operatively connecting the extended end of said shaft to said pump whereby the latter is driven.

AUSTIN HENRY KELDERHOUSE.